United States Patent
Koo et al.

(10) Patent No.: US 10,523,945 B2
(45) Date of Patent: Dec. 31, 2019

(54) METHOD FOR ENCODING AND DECODING VIDEO SIGNAL

(71) Applicant: LG Electronics Inc., Seoul (KR)

(72) Inventors: Moonmo Koo, Seoul (KR); Sehoon Yea, Seoul (KR); Eunyong Son, Seoul (KR); Kyuwoon Kim, Seoul (KR); Jin Heo, Seoul (KR); Junghak Nam, Seoul (KR); Bumshik Lee, Seoul (KR)

(73) Assignee: LG Electronics Inc., Seoul (KR)

(*) Notice: Subject to any disclaimer, the term of this patent is extended or adjusted under 35 U.S.C. 154(b) by 57 days.

(21) Appl. No.: 15/768,294

(22) PCT Filed: Oct. 13, 2016

(86) PCT No.: PCT/KR2016/011509
§ 371 (c)(1),
(2) Date: Apr. 13, 2018

(87) PCT Pub. No.: WO2017/065534
PCT Pub. Date: Apr. 20, 2017

(65) Prior Publication Data
US 2018/0309996 A1 Oct. 25, 2018

Related U.S. Application Data

(60) Provisional application No. 62/241,705, filed on Oct. 14, 2015, provisional application No. 62/241,119, filed on Oct. 13, 2015.

(51) Int. Cl.
*H04B 1/66* (2006.01)
*H04N 19/13* (2014.01)
(Continued)

(52) U.S. Cl.
CPC ........... *H04N 19/13* (2014.11); *H04N 19/105* (2014.11); *H04N 19/11* (2014.11); *H04N 19/14* (2014.11);
(Continued)

(58) Field of Classification Search
CPC ...... G10L 19/24; H04N 19/176; H04N 5/208; H04N 5/23212; G01R 33/5611;
(Continued)

(56) References Cited

U.S. PATENT DOCUMENTS

2011/0249739 A1* 10/2011 Liu ............... H04N 19/176
375/240.12
2015/0181210 A1 6/2015 Kimura

FOREIGN PATENT DOCUMENTS

KR 714355 B1 5/2007
KR 2014005232 B1 1/2014
(Continued)

*Primary Examiner* — Sath V Perungavoor
*Assistant Examiner* — Peet Dhillon
(74) *Attorney, Agent, or Firm* — Fish & Richardson P.C.

(57) ABSTRACT

The present invention provides a method for encoding a video signal comprising the steps of: obtaining activity information from the video signal, wherein the activity signal indicates information relating to edge characteristics of an image and includes edge orientation information and/or edge level information; determining conditionally non-linear transform (CNT) configuration information on the basis of the activity information; and performing CNT prediction coding on the basis of the CNT configuration information, wherein the CNT prediction coding involves performing prediction using all previously decoded pixel values.

14 Claims, 16 Drawing Sheets

(51) Int. Cl.
*H04N 19/70* (2014.01)
*H04N 19/172* (2014.01)
*H04N 19/157* (2014.01)
*H04N 19/105* (2014.01)
*H04N 19/14* (2014.01)
*H04N 19/176* (2014.01)
*H04N 19/11* (2014.01)

(52) U.S. Cl.
CPC ......... *H04N 19/157* (2014.11); *H04N 19/172* (2014.11); *H04N 19/176* (2014.11); *H04N 19/70* (2014.11)

(58) Field of Classification Search
CPC .......... G06Q 30/08; G06T 2207/20064; G06T 2207/10016; G06T 5/003; G06T 5/20
See application file for complete search history.

(56) References Cited

FOREIGN PATENT DOCUMENTS

| | | | | |
|---|---|---|---|---|
| KR | 2015021822 | B1 | 3/2015 | |
| WO | WO-2015068051 | A2 * | 5/2015 | ........... H04N 19/132 |
| WO | WO2015068051 | B1 | 5/2015 | |

* cited by examiner

[FIG. 1]
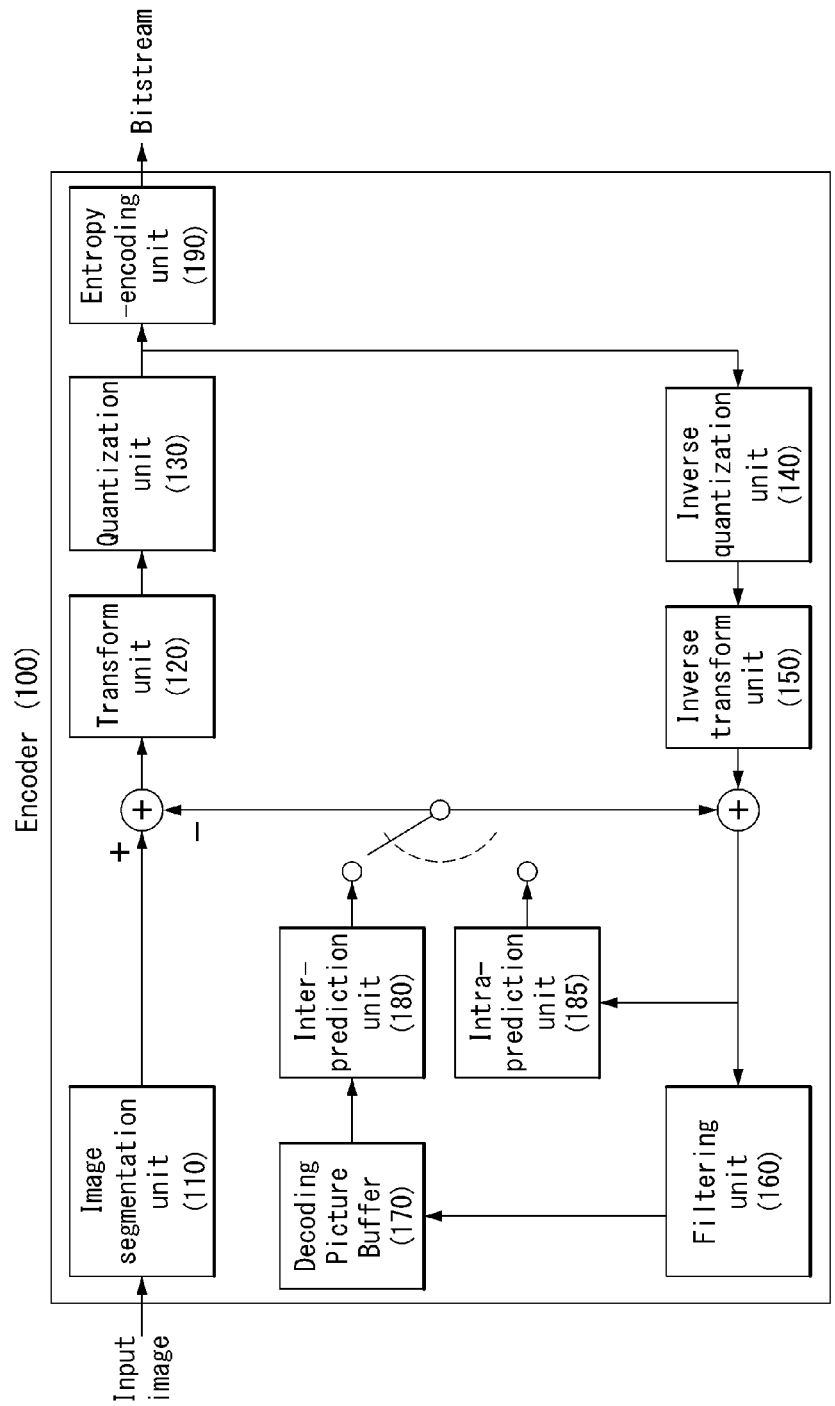

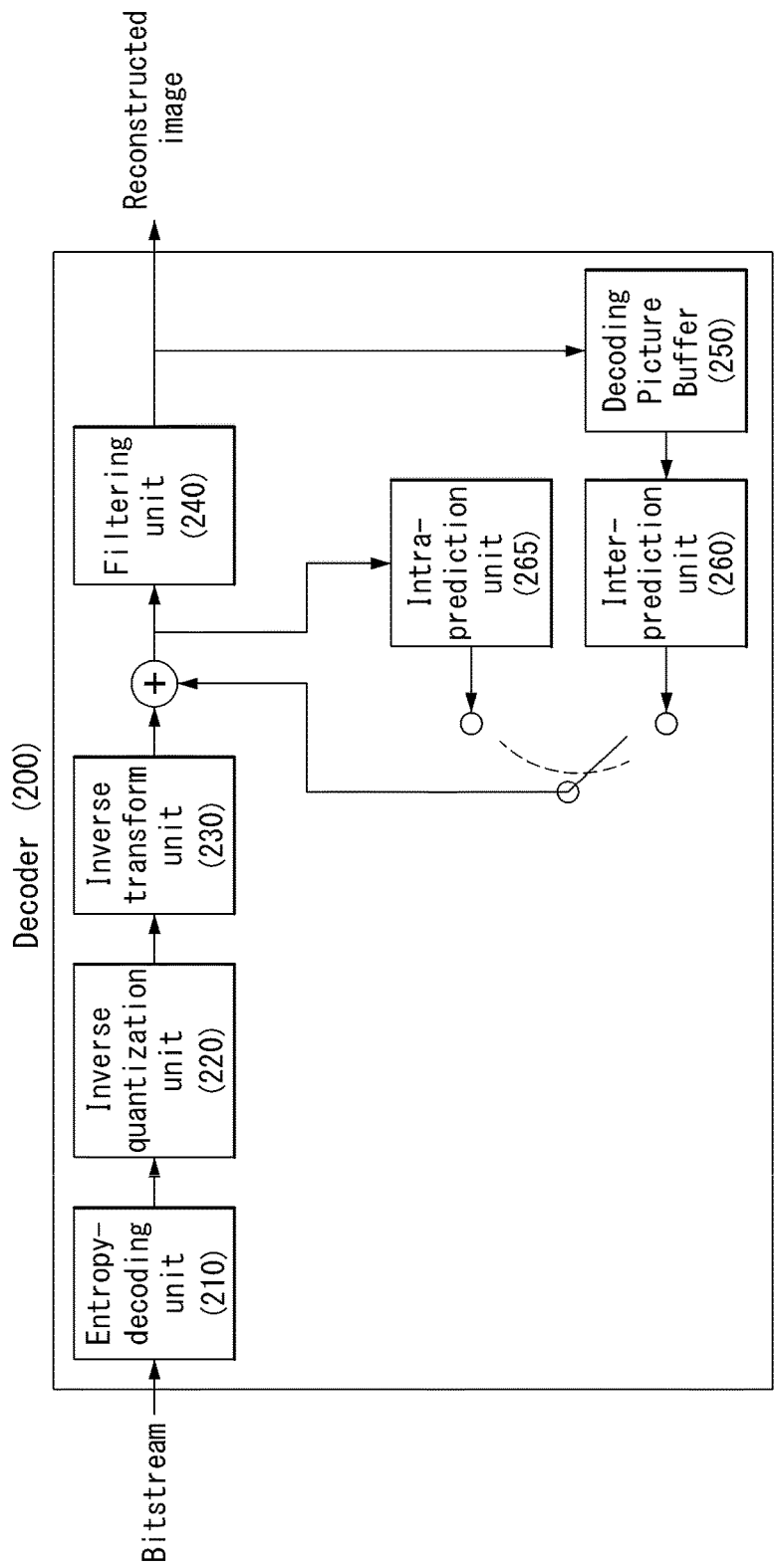
[FIG. 2]

[FIG. 3]
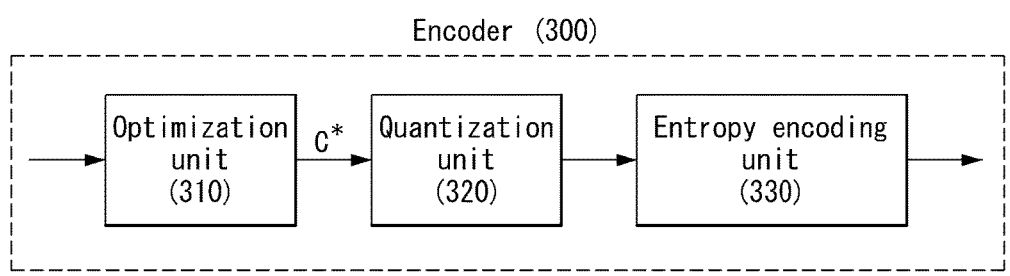
[FIG. 4]
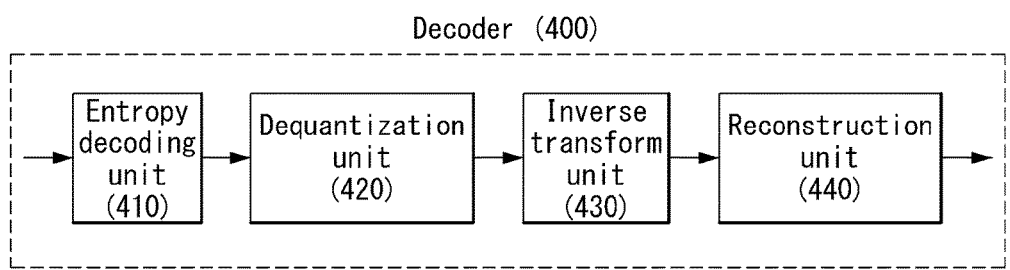

[FIG. 5]
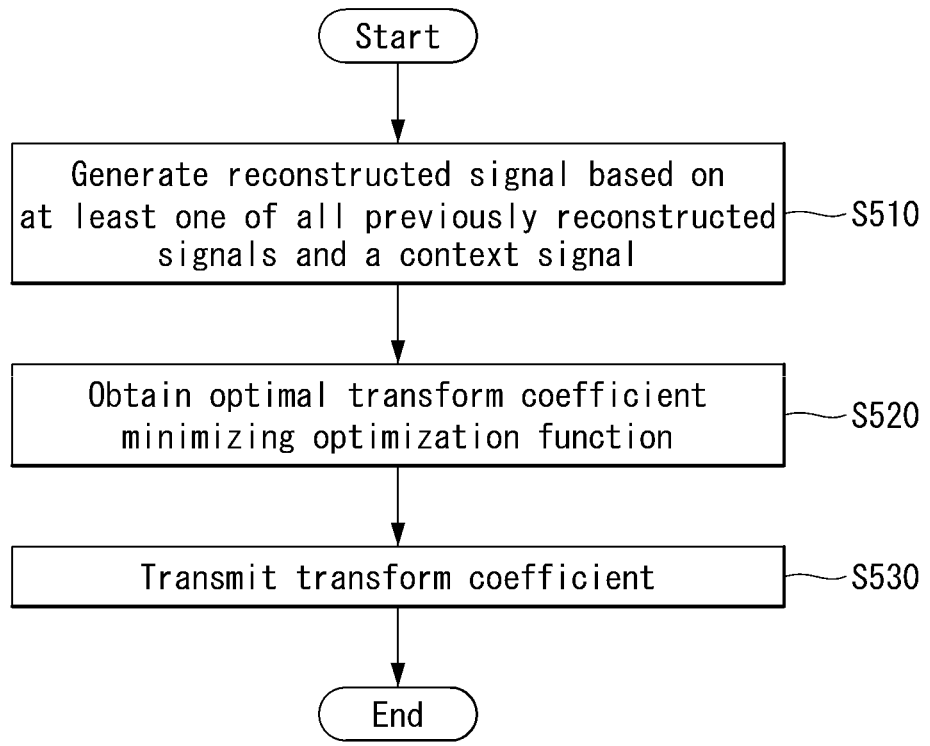

[FIG. 6]
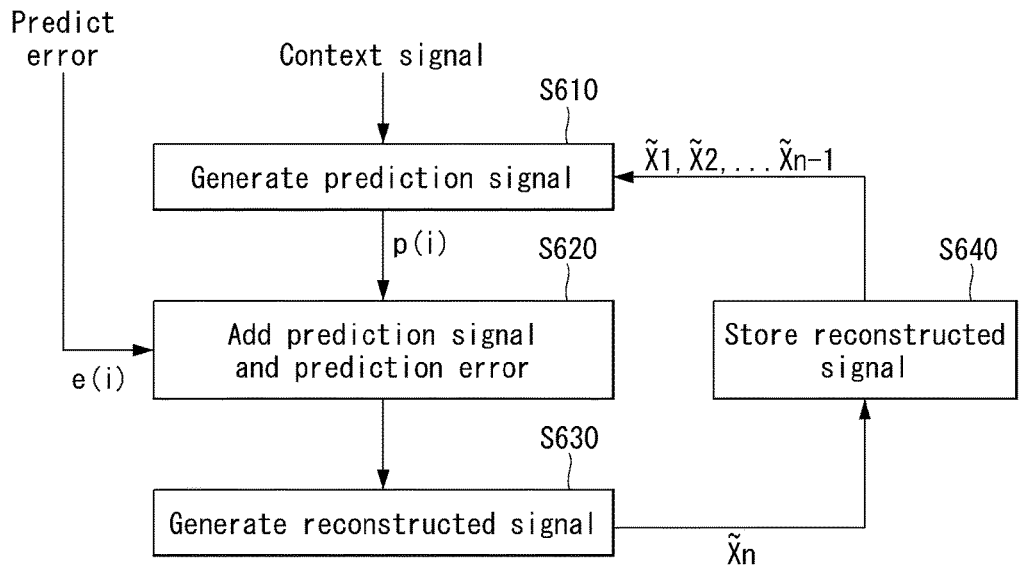
[FIG. 7]
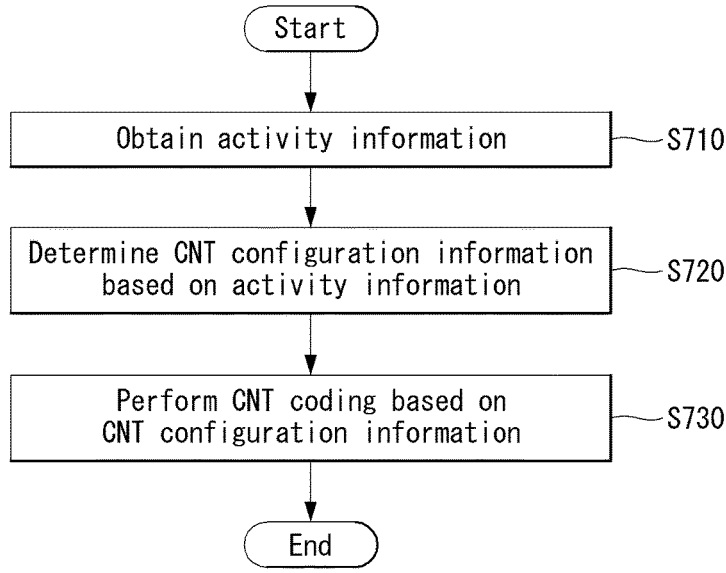

[FIG. 8]
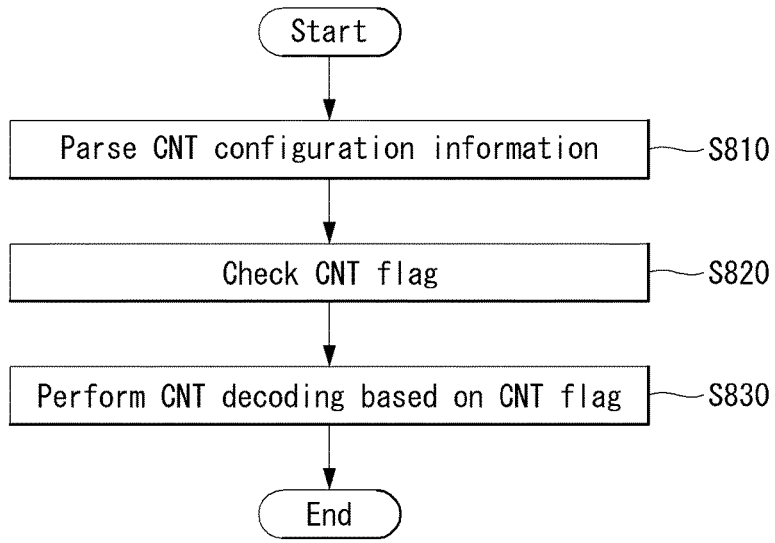
[FIG. 9]
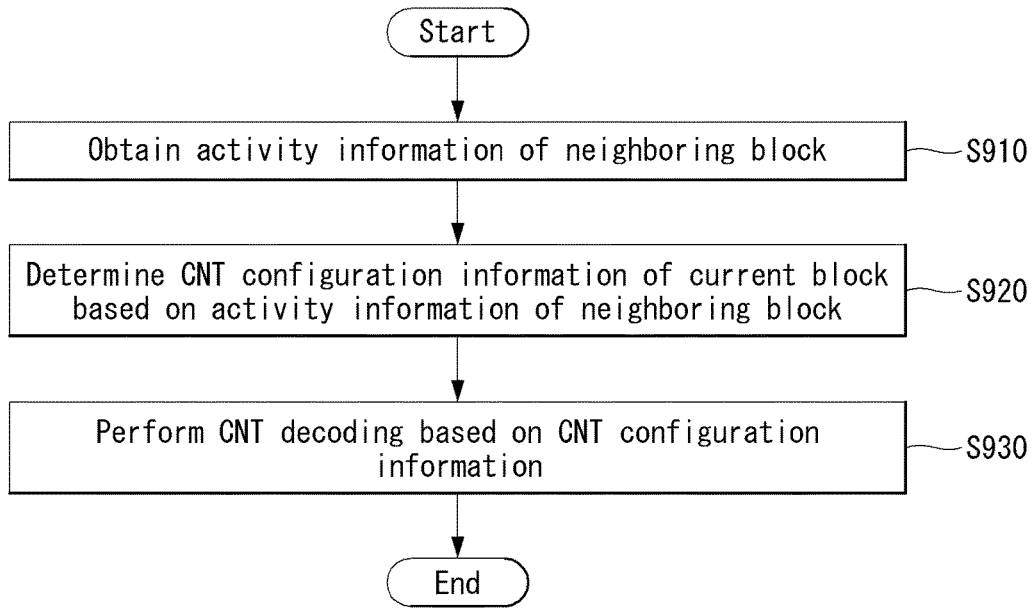

[FIG. 10]

|  | pic_parameter_set_rbsp() { | Descriptor |
|---|---|---|
|  | ...... |  |
| 1010 | CNT_flag_transfer_unit_size | ue(v) |
| 1020 | CNT_flag_context_model_idx | ue(v) |
| 1030 | CNT_directional_mode_cfg_idx | ue(v) |
|  | ...... |  |
|  | if( pps_extension_flag ) |  |
|  | while( more_rbsp_data()) |  |
|  | pps_extension_data_flag | u(1) |
|  | rbsp_trailing_bits() |  |
|  |  |  |

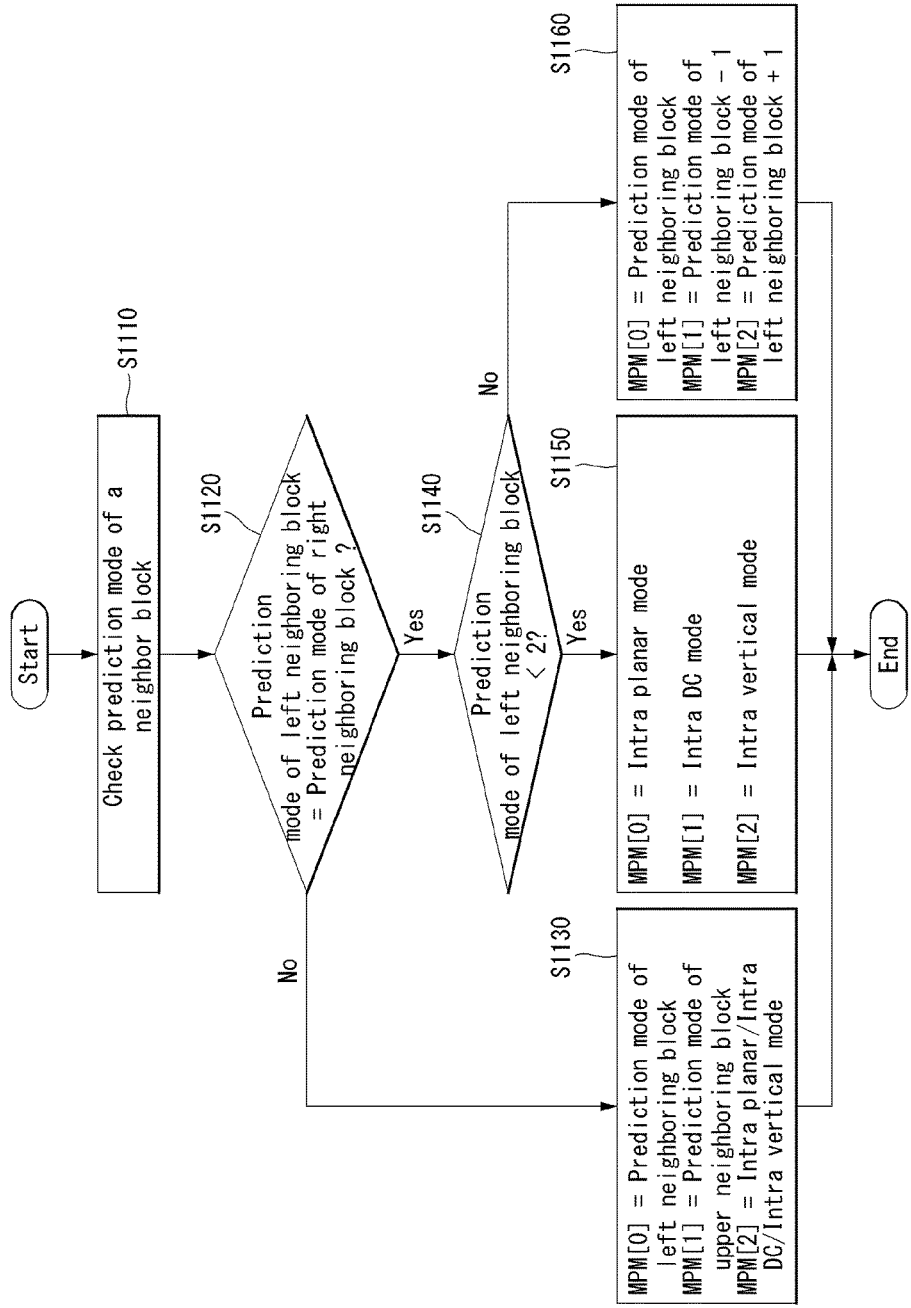

[FIG. 12]
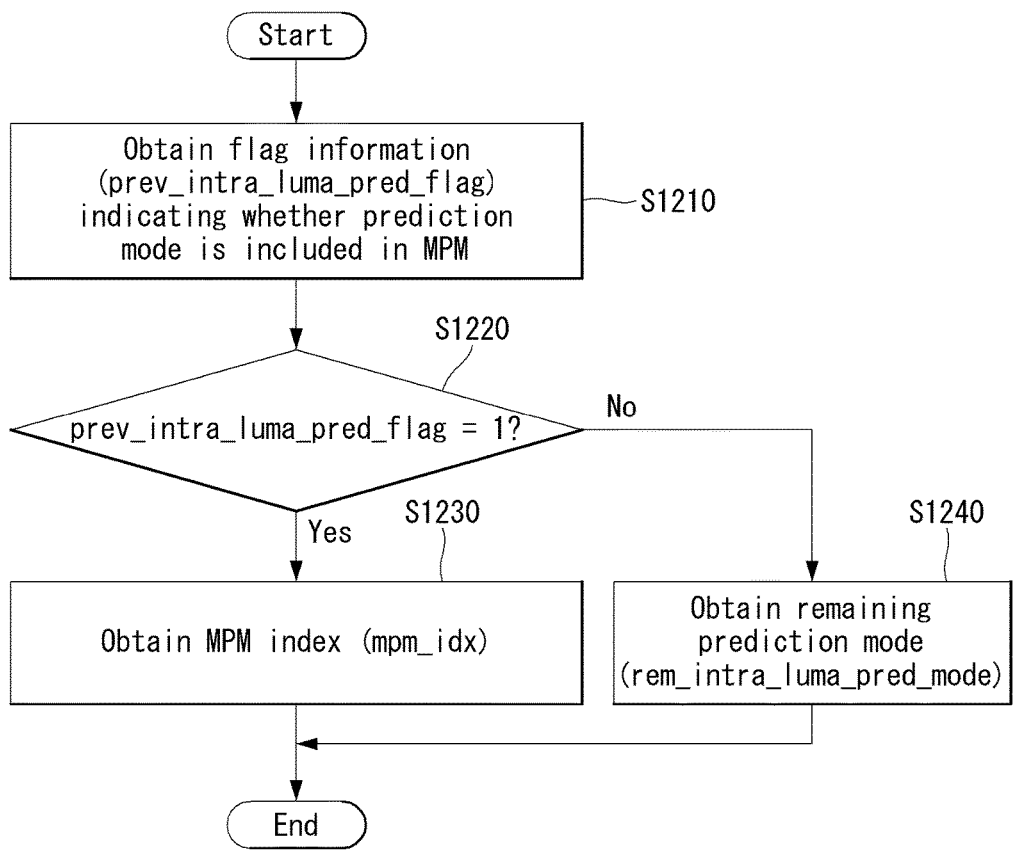

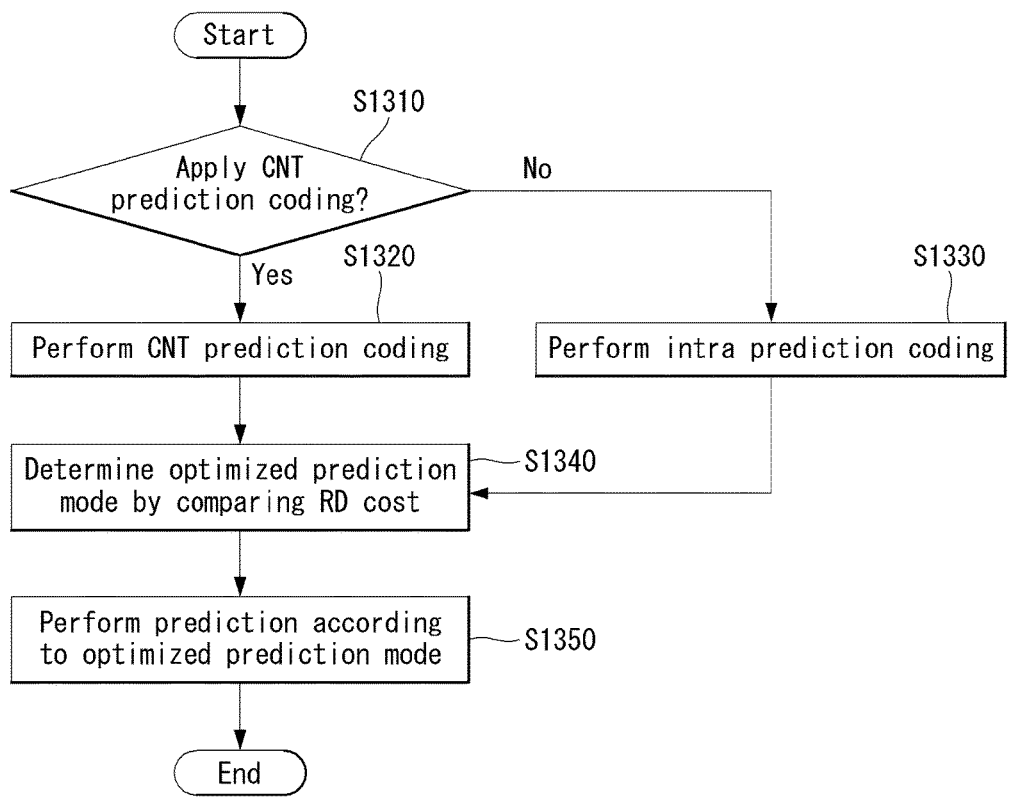
[FIG. 13]

[FIG. 14]
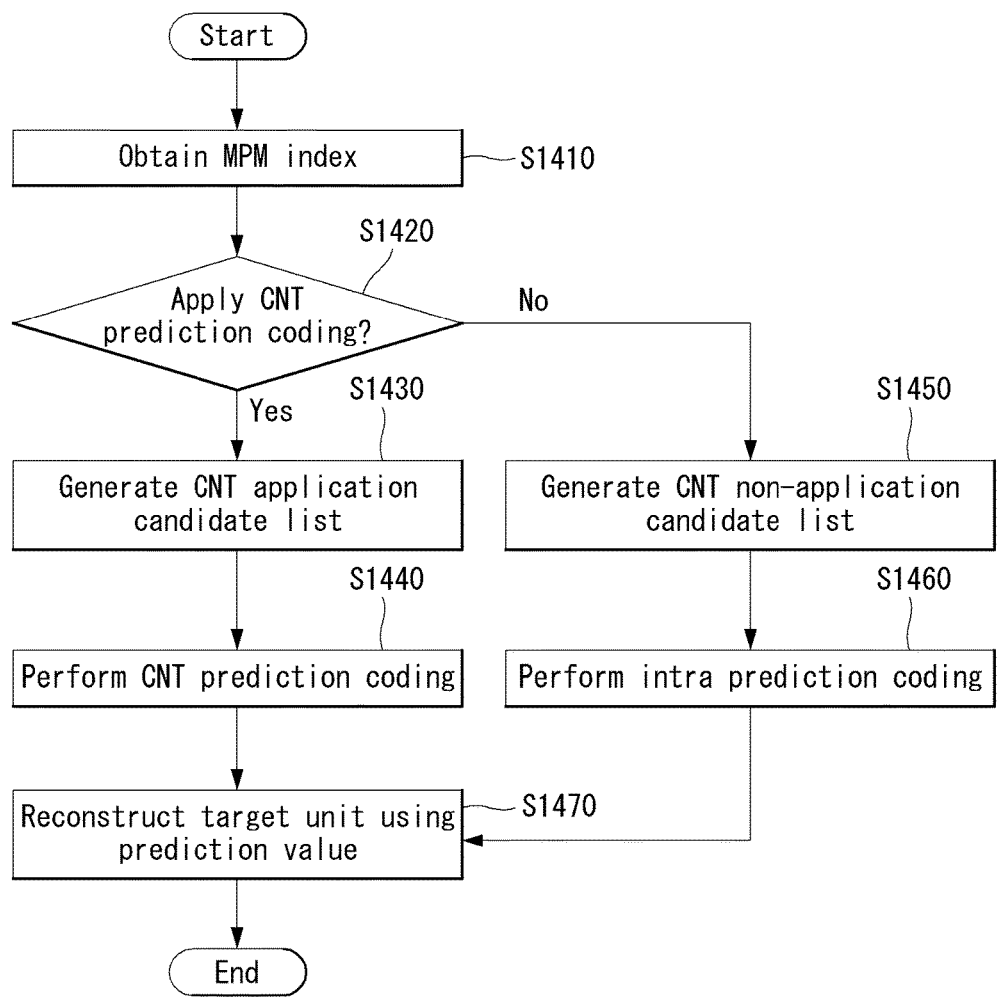

[FIG. 15]

| | Descriptor |
|---|---|
| coding_unit( x0, y0, log2CbSize ) { | |
| ........ | |
| if( CuPredMode[ x0 ][ y0 ] == MODE_INTRA ) { | |
| ........ | |
| pbOffset = ( PartMode == PART_NxN ) ? ( nCbS / 2 ) : nCbS | |
| for( j = 0; j < nCbS; j = j + pbOffset ) | |
|   for( i = 0; i < nCbS; i = i + pbOffset ) | |
|     prev_intra_luma_pred_flag[ x0 + i ][ y0 + j ] | ae(v) |
| for( j = 0; j < nCbS; j = j + pbOffset ) | |
|   for( i = 0; i < nCbS; i = i + pbOffset ) | |
|     if( prev_intra_luma_pred_flag[ x0 + i ][ y0 + j ] ) | |
| 1510      CNT_flag[ x0 + i ][ y0 + j ] | ae(v) |
|      mpm_idx[ x0 + i ][ y0 + j ] | ae(v) |
|     else | |
|      rem_intra_luma_pred_mode[ x0 + i ][ y0 + j ] | ae(v) |
| ........ | |

[FIG. 16]

| | | Descriptor |
|---|---|---|
| | coding_unit( x0, y0, log2CbSize ) { | |
| | ....... | |
| | if( CuPredMode[ x0 ][ y0 ] == MODE_INTRA ) { | |
| | ...... | |
| | pbOffset = ( PartMode == PART_NxN ) ? ( nCbS / 2 ) : nCbS | |
| | for( j = 0; j < nCbS; j = j + pbOffset ) | |
| |   for( i = 0; i < nCbS; i = i + pbOffset ) | |
| |     prev_intra_luma_pred_flag[ x0 + i ][ y0 + j ] | ae(v) |
| | for( j = 0; j < nCbS; j = j + pbOffset ) | |
| |   for( i = 0; i < nCbS; i = i + pbOffset ) | |
| |     if( prev_intra_luma_pred_flag[ x0 + i ][ y0 + j ] ) | |
| 1610 |       CNT_flag[ x0 + i ][ y0 + j ] | ae(v) |
| 1620 |       if( CNT_flag[ x0 + i ][ y0 + j ] == 1 ) | |
| 1630 |         CNT_remaining_mode_flag[ x0 + i ][ y0 + j ] | ae(v) |
| 1640 |         if( CNT_remaining_mode_flag[ x0 + i ][ y0 + j ] == 1 ) | |
| 1650 |           CNT_remaining_mode_idx[ x0 + i ][ y0 + j ] | ae(v) |
| 1660 |       if( CNT_flag[ x0 + i ][ y0 + j ] == 0 || ( CNT_flag[ x0 + i ][ y0 + j ] == 1 && CNT_remaining_mode_flag[ x0 + i ][ y0 + j ] == 0 ) ) | |
| 1670 |         mpm_idx[ x0 + i ][ y0 + j ] | ae(v) |
| |       else | |
| 1680 |         rem_intra_luma_pred_mode[ x0 + i ][ y0 + j ] | ae(v) |
| | ....... | |

[FIG. 17]

| | | Descriptor |
|---|---|---|
| | coding_unit( x0, y0, log2CbSize ) { | |
| | ...... | |
| | if( CuPredMode[ x0 ][ y0 ] = = MODE_INTRA ) { | |
| | ...... | |
| | pbOffset = ( PartMode = = PART_NxN ) ? ( nCbS / 2 ) : nCbS | |
| | for( j = 0; j < nCbS; j = j + pbOffset ) | |
| | for( i = 0; i < nCbS; i = i + pbOffset ) | |
| | prev_intra_luma_pred_flag[ x0 + i ][ y0 + j ] | ae(v) |
| | for( j = 0; j < nCbS; j = j + pbOffset ) | |
| | for( i = 0; i < nCbS; i = i + pbOffset ) | |
| | if( prev_intra_luma_pred_flag[ x0 + i ][ y0 + j ] ) | |
| 1710 | CNT_flag[ x0 + i ][ y0 + j ] | ae(v) |
| 1720 | mpm_idx[ x0 + i ][ y0 + j ] | ae(v) |
| 1730 | if( CNT_flag[ x0 + i ][ y0 + j ] = = 1 && mpm_idx[ x0 + i ][ y0 + j ] = = 3 ) | |
| 1740 | CNT_remaining_mode_idx[ x0 + i ][ y0 + j ] | ae(v) |
| | else | |
| 1750 | rem_intra_luma_pred_mode[ x0 + i ][ y0 + j ] | ae(v) |
| | ...... | |

[FIG. 18]

| | Descriptor |
|---|---|
| coding_unit( x0, y0, log2CbSize ) { | |
| ...... | |
| if( CuPredMode[ x0 ][ y0 ] == MODE_INTRA ) { | |
| ...... | |
| pbOffset = ( PartMode == PART_NxN ) ? ( nCbS / 2 ) : nCbS | |
| for( j = 0; j < nCbS; j = j + pbOffset ) | |
| for( i = 0; i < nCbS; i = i + pbOffset ) | |
| prev_intra_luma_pred_flag[ x0 + i ][ y0 + j ] | ae(v) |
| for( j = 0; j < nCbS; j = j + pbOffset ) | |
| for( i = 0; i < nCbS; i = i + pbOffset ) | |
| if( prev_intra_luma_pred_flag[ x0 + i ][ y0 + j ] ) | |
| 1810   mpm_idx[ x0 + i ][ y0 + j ] | ae(v) |
| 1820   if( mpm_idx[ x0 + i ][ y0 + j ] == 3 ) | |
|        CNT_mode_idx[ x0 + i ][ y0 + j ] | ae(v) |
|        else | |
| 1830   rem_intra_luma_pred_mode[ x0 + i ][ y0 + j ] | ae(v) |
| ...... | |

[FIG. 19]

| | | Descriptor |
|---|---|---|
| coding_unit( x0, y0, log2CbSize ) { | | |
| | ...... | |
| | if( CuPredMode[ x0 ][ y0 ] == MODE_INTRA ) { | |
| | ...... | |
| | pbOffset = ( PartMode == PART_NxN ) ? ( nCbS / 2 ) : nCbS | |
| | for( j = 0; j < nCbS; j = j + pbOffset ) | |
| |   for( i = 0; i < nCbS; i = i + pbOffset ) | |
| |     prev_intra_luma_pred_flag[ x0 + i ][ y0 + j ] | ae(v) |
| | for( j = 0; j < nCbS; j = j + pbOffset ) | |
| |   for( i = 0; i < nCbS; i = i + pbOffset ) | |
| |     if( prev_intra_luma_pred_flag[ x0 + i ][ y0 + j ] ) | |
| |       mpm_idx[ x0 + i ][ y0 + j ] | ae(v) |
| 1910 |       else | |
| 1920 |         CNT_flag[ x0 + i ][ y0 + j ] | ae(v) |
| 1930 |         if( CNT_flag[ x0 + i ][ y0 + j ] == 1 ) | |
| |           CNT_mode_idx[ x0 + i ][ y0 + j ] | ae(v) |
| 1940 |         else | |
| |           rem_intra_luma_pred_mode[ x0 + i ][ y0 + j ] | ae(v) |
| | ...... | |

METHOD FOR ENCODING AND DECODING VIDEO SIGNAL

CROSS-REFERENCE TO RELATED APPLICATIONS

This application is a National Stage application under 35 U.S.C. § 371 of International Application No. PCT/KR2016/011509, filed Oct. 13, 2016, which claims the benefit of U.S. Provisional Patent Application No. 62/241,705, filed on Oct. 14, 2015, and U.S. Provisional patent Application No. 62/241,119, filed on Oct. 13, 2015. The disclosures of the prior applications are incorporated by reference in their entirety.

TECHNICAL FIELD

The present invention relates to a method for encoding and decoding video signal and an apparatus therefor and, more particularly, to a method for processing a video signal based on a Conditionally Non-linear Transform (CNT) coding technique and an apparatus therefor.

BACKGROUND ART

Compression coding means a set of signal processing techniques for sending digitalized information through a communication line or storing digitalized information in a form suitable for a storage medium. Media, such as videos, images, and voice may be the subject of compression coding. In particular, a technique for performing compression coding on videos is called video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

In particular, prediction coding cannot utilize any statistical dependency when it comes to obtaining a prediction error sample, and transformation coding needs to depend on only the first available data to acquire a prediction value of a sample. For this reason, a prediction signal is hard to have a high quality and this problem needs to be overcome efficiently.

DISCLOSURE

Technical Problem

The present invention provides a method for performing prediction using the most recently reconstructed data.

The present invention provides a method for processing a target unit using a Conditionally Non-linear Transform (CNT) coding technique.

The present invention provides a method for applying advantages of each coding technique based on combination of new prediction/transform coding.

The present invention provides a method for determining CNT configuration information using activity information.

The present invention provides a method for transmitting CNT configuration information based on activity information.

The present invention provides a method for processing additional information of a CNT coding technique.

The present invention provides a method for defining or transmitting CNT flag information.

Technical Solution

The present invention provides a method for configure Conditionally Non-linear Transform (CNT) configuration information by inferring activity information of the current block based on activity information of a neighboring block.

The present invention provides a method for configuring a Context-Adaptive Binary Arithmetic Coding (CABAC) context modeling of a CNT prediction mode, a CNT flag, and CNT additional information by analyzing activity information of an original picture.

The present invention provides a method for transmitting CNT configuration information at a level of a Sequence Parameter Set (SPS) and/or Picture Parameter Set (PPS).

The present invention provides a method for transmitting an index indicating a pre-defined configuration set that configures CNT configuration information.

The present invention provides a method for generating a list of Most Probable Modes (MPM) candidates corresponding to CNT coding.

The present invention provides a method for designate remaining modes other than MPM candidates by transmitting a CNT remaining mode flag.

The present invention provides a method for omitting transmission of a CNT flag by defining a MPM index which indicates a CNT prediction mode.

The present invention provides a method for transmitting a CNT flag only when a MPM flag is 0.

The present invention provides a method for transmitting a CNT flag only for a specific prediction mode.

The present invention provides a method for configuring prediction modes in which a CNT flag is additionally transmitted with respect to a CNT flag based on a prediction direction of a neighboring block.

The present invention provides a method for configuring prediction modes in which a CNT flag is additionally transmitted with respect to the current block based on whether CNT coding is performed on a neighboring block.

The present invention provides a method for transmitting a CNT flag with two or more layers.

The present invention provides a CNT coding technique that considers correlation between pixels in a transform domain.

The present invention provides a method for processing a video signal using a CNT coding technique.

The present invention provides a method for acquiring an optimized transform coefficient by considering all previously reconstructed signal in a prediction process.

Advantageous Effects

The present invention may analyze activity information extracted from a still image or a video, and configure optimized CNT (Conditionally Non-linear Transform) information for a corresponding image or block using the analyzed activity information, thereby remarkably reducing an amount of compressed data of the image.

In addition, the present invention may efficiently code a CNT flag, indicating whether to apply CNT, when applying CNT to a still image or a video, thereby reducing a CNT flag transmission amount and accordingly enhancing compression efficiency.

In addition, the present invention may utilize a CNT coding technique that considers correlation between pixels in a transform domain, thereby enhancing compression efficiency.

In addition, the present invention may combine prediction coding and transform coding, thereby achieving advantages of each of the coding techniques. That is, by using all previously reconstructed signals, it is possible to perform more sophisticated and enhanced prediction and utilize statistical dependency of a prediction error sample. In addition, coding is performed by simultaneously applying prediction and transform with respect to a single dimension, thereby efficiently coding a high quality image including a non-smooth non-stationary signal.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 is a schematic block diagram of an encoder and a decoder to which Conditionally Non-linear Transform (CNT) coding technique is applied according to an embodiment of the present invention.

FIG. 4 is a schematic block diagram of an encoder and a decoder to which CNT coding technique is applied according to an embodiment of the present invention.

FIG. 5 is a schematic flowchart illustrating a CNT coding method according to an embodiment of the present invention.

FIG. 6 is a flowchart illustrating a method for generating an optimized prediction signal based on a CNT coding method according to an embodiment of the present invention.

FIG. 7 is a flowchart illustrating a method for determining CNT configuration information based on activity information according to an embodiment of the present invention.

FIG. 8 is a flowchart illustrating a method for performing CNT decoding based on a CNT flag according to an embodiment of the present invention.

FIG. 9 is a flowchart illustrating a method for determining CNT configuration information of the current block based on activity information of a neighboring block according to an embodiment of the present invention.

FIG. 10 shows a syntax for transmitting CNT configuration information according to an embodiment of the present invention.

FIG. 11 is a flowchart illustrating a method for encoding an intra prediction mode according to an embodiment of the present invention.

FIG. 12 is a flowchart illustrating a method for deciding an intra prediction mode according to an embodiment of the present invention.

FIG. 13 is a flowchart illustrating a method for determining an optimized prediction mode depending on whether CNT prediction coding is applied, according to an embodiment of the present invention.

FIG. 14 is a flowchart illustrating a method for performing CNT prediction coding based on an MPM index according to an embodiment of the present invention.

FIGS. 15 to 19 show syntaxes for efficiently transmitting CNT configuration information and/or CNT coding information according to an embodiment of the present invention.

BEST MODE

The present invention provides a method for encoding a video signal, including: obtaining activity information from the video signal, wherein the activity information represents information related to edge property of an image and includes at least one of edge direction information or edge level information; determining Conditionally Non-linear Transform (CNT) configuration information based on the activity information; and performing a CNT prediction coding based on the CNT configuration information, wherein the CNT prediction coding comprises performing a prediction using all previously decoded pixel values.

In the present invention, when the activity information is obtained from an entire original image of the video signal, the CNT configuration information may be applied to the entire original image.

In the present invention, when the activity information is obtained from a reconstructed neighboring block of the video signal, the CNT configuration information may be applied to a current block.

In the present invention, edge direction information of the current block is derived based on whether a left neighboring block and an upper neighboring block have same prediction directional information.

In the present invention, when the left neighboring block and the upper neighboring block have the same prediction directional information, the current block has the same edge direction information, and, when the left neighboring block and the upper neighboring block have different prediction directional information, the current block is set to have edge direction information of a neighboring block having greater edge level information.

In the present invention, the CNT configuration information may include at least one of transmission unit information for transmitting a CNT flag, context model index information indicating a Context-Adaptive Binary Arithmetic Coding (CABAC) context model used in CNT flag coding, or a CNT prediction mode set indicating a CNT prediction mode.

In the present invention, a number of the CNT prediction modes may be determined based on the edge direction information.

In the present invention, the CNT configuration information may be transmitted through at least one level of a sequence parameter set (SPS), a picture parameter set (PPS), a picture, a coding tree unit (CTU), a coding unit (CU), a prediction unit (PU), or a block.

The present invention provides a method for decoding a video signal, including: obtaining activity information from a reconstructed neighboring block, wherein the activity information represents information related to edge property of an image and includes at least one of edge direction information or edge level information; deriving Conditionally Non-linear Transform (CNT) configuration information for a current block based on the activity information; and performing CNT prediction coding on the current block based on the CNT configuration information, wherein the CNT prediction coding is performing prediction using all previously decoded pixel values according to CNT prediction modes.

In the present invention, the method may further include extracting a CNT flag for the current block from the video signal, wherein the CNT flag indicates whether CNT coding is applied to the current block, and wherein, when CNT coding is applied to the current block according to the CNT flag, the CNT prediction coding is performed.

The present invention provides An apparatus for encoding a video signal, including: an edge detection unit configured to obtain activity information from the video signal; and a predication unit configured to determine Conditionally Non-linear Transform (CNT) configuration information based on the activity information, and perform CNT prediction coding based on the CNT configuration information, wherein the activity information represents information related to edge property of an image and includes at least one of edge direction information or edge level information, and wherein the CNT prediction coding performs prediction using all previously decoded pixel values according to CNT prediction modes.

The present invention provides an apparatus for decoding a video signal, including: a prediction unit configured to obtain activity information from a reconstructed neighboring block, determine Conditionally Non-linear Transform (CNT) configuration information for a current block based on the activity information, and perform CNT prediction coding on the current block based on the CNT configuration information; and a reconstruction unit configured to reconstruct the current block using a CNT prediction coding result value, wherein the activity information represents information related to edge property of an image and includes at least one of edge direction information or edge level information, and wherein the CNT prediction coding is performing prediction using all previously decoded pixel values according to CNT prediction modes.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be interpreted as being based on the name of a term used in a corresponding description of this specification, but should be interpreted by checking the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process.

Furthermore, the concepts and methods of embodiments described in this specification may be applied to other embodiments, and a combination of the embodiments may be applied without departing from the technical spirit of the present invention although they are not explicitly all described in this specification.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The intra predictor 185 may be classified mainly into prediction mode coding and residual signal coding. In the case of coding a prediction mode, a prediction mode of a neighboring block may be used as a prediction value for a prediction mode of the current block. Thus, the more accurate the prediction mode of neighboring blocks, the more accurate the prediction for a prediction mode of the current block may be.

The prediction signal generated via the inter-prediction unit 180 or the intra-prediction unit 185 may be used to generate the reconstructed signal or used to generate the residual signal.

In addition, the inter prediction unit 180 or the intra prediction unit 185 may generate a prediction signal using all previously reconstructed signals based on a CNT coding technique to which the present invention is applied.

FIG. 2 shows a schematic block diagram of a decoder for decoding a video signal, in accordance with one embodiment of the present invention.

Referring to FIG. 2, a decoder 200 may include a parsing unit(not shown), an entropy-decoding unit 210, an inverse quantization unit 220, an inverse transform unit 230, a filtering unit 240, a decoded picture buffer (DPB) 250, an inter-prediction unit 260, an intra-prediction unit 265, and a reconstruction unit(not shown).

A reconstructed video signal output from the decoder 200 may be reproduced using a reproducing device.

The decoder 200 may receive a video signal output from the encoder 100 of FIG. 1, and parse syntax elements from the video signal through a parsing unit (not shown). The parsed signal may be entropy decoded through the entropy decoding unit 210 or may be transmitted to another function unit.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3 and 4 are schematic block diagrams of an encoder and a decoder to which Conditionally Non-linear Transform (CNT) coding technique is applied according to an embodiment of the present invention.

In the existing codec, if transform coefficients for N data are to be obtained, N prediction data is extracted from the N original data at once, and transform coding is then applied to the obtained N residual data or a prediction error. In such a case, the prediction process and the transform process are sequentially performed.

However, if prediction is performed on video data including N pixels in a pixel unit using the most recently reconstructed data, the most accurate prediction results may be obtained. For this reason, to sequentially apply prediction and transform in an N-pixel unit may not be said to be an optimized coding method.

Meanwhile, in order to obtain the most recently reconstructed data in a pixel unit, residual data must be reconstructed by performing inverse transform on already obtained transform coefficients, and then the reconstructed residual data must be added to prediction data. However, in the existing coding method, it is impossible to reconstruct data in a pixel unit itself because transform coefficients can be obtained by applying transform only after prediction for N data is ended.

Accordingly, the present invention proposes a method of obtaining a transform coefficient using a previously reconstructed signal and a context signal.

The encoder 300 of FIG. 3 includes an optimization unit 310, a quantization unit 320, and an entropy encoding unit 330. The decoder 400 of FIG. 4 includes an entropy decoding unit 410, a dequantization unit 420, an inverse transform unit 430, and a reconstruction unit 440.

Referring to the encoder 300 of FIG. 3, the optimization unit 310 obtains an optimized transform coefficient. The optimization unit 310 may use the following embodiments in order to obtain the optimized transform coefficient.

In order to illustrate an embodiment to which the present invention may be applied, first, a reconstruction function for reconstructing a signal may be defined as the following equation 1.

$$\tilde{x}=R(c,y) \quad \text{[Equation 1]}$$

In Equation 1, $\tilde{x}$ denotes a reconstructed signal, c denotes a decoded transform coefficient, and y denotes a context signal. R(c,y) denotes a nonlinear reconstruction function using c and y in order to generate a reconstructed signal.

In one embodiment to which the present invention is applied, there is provided a method of generating an advanced non-linear predictor in order to obtain an optimized transform coefficient.

In the present embodiment, a prediction signal may be defined as a relation between previously reconstructed values and a transform coefficient. That is, the encoder and the decoder to which the present invention is applied may generate an optimized prediction signal by taking into consideration all of previously reconstructed signals when performing a prediction process. Furthermore, a non-linear prediction function may be applied as a prediction function for generating a prediction signal.

Accordingly, each of decoded transform coefficients affects the entire reconstruction process and enables control of a prediction error included in a prediction error vector. For example, the prediction error signal may be defined as the following equation 2.

$$e = Tc \qquad \text{[Equation 2]}$$

In this case, e indicates a prediction error signal, c indicates a decoded transform coefficient, and T indicates a transform matrix.

In this case, the reconstructed signal may be defined as the following equation 3.

$$\tilde{x}_1 = R_1(e_1, y) \qquad \text{[Equation 3]}$$
$$\tilde{x}_2 = R_2(e_2, y, \tilde{x}_1)$$
$$\vdots$$
$$\tilde{x}_n = R_n(e_n, y, \tilde{x}_1, \tilde{x}_2, \ldots, \tilde{x}_{n-1})$$

In this case, $\tilde{x}_n$ indicates an n-th reconstructed signal, en indicates an n-th prediction error signal, y indicates a context signal, and Rn indicates a non-linear reconstruction function using en and y in order to generate a reconstructed signal.

For example, the non-linear reconstruction function Rn may be defined as the following equation 4.

$$R_1(e_1, y) = P_1(y) + e_1 \qquad \text{[Equation 4]}$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \tilde{x}_2, \ldots, \tilde{x}_{n-1}) + e_n$$

In this case, Pn indicates a non-linear prediction function including the variables in order to generate a prediction signal.

The non-linear prediction function may be a combination of linear functions in addition to a combination of a median function and a rank order filter and a non-linear function, for example. Furthermore, the non-linear prediction function Pn ( ) may be different non-linear functions.

In another embodiment, the encoder 300 and the decoder 400 to which the present invention is applied may include the storage of candidate functions for selecting the non-linear prediction function.

For example, the optimization unit 310 may select an optimized non-linear prediction function in order to generate an optimized transform coefficient. In this case, the optimized non-linear prediction function may be selected from the candidate functions stored in the storage.

The optimization unit 310 may generate an optimized transform coefficient by selecting the optimized non-linear prediction function as described above.

Meanwhile, the output transform coefficient is transmitted to the quantization unit 320. The quantization unit 320 quantizes the transform coefficient and sends the quantized transform coefficient to the entropy encoding unit 330.

The entropy encoding unit 330 may perform entropy encoding on the quantized transform coefficient and output a compressed bitstream.

The decoder 400 of FIG. 4 may receive the compressed bitstream from the encoder of FIG. 3, may perform entropy decoding through the entropy decoding unit 410, and may perform dequantization through the dequantization unit 420. In this case, a signal output by the dequantization unit 420 may mean an optimized transform coefficient.

The inverse transform unit 430 receives the optimized transform coefficient, performs an inverse transform process, and may generate a prediction error signal through the inverse transform process.

The reconstruction unit 440 may obtain a reconstructed signal by adding the prediction error signal and a prediction signal together. In this case, various embodiments described with reference to FIG. 3 may be applied to the prediction signal.

FIG. 5 is an embodiment to which the present invention may be applied and is a schematic flowchart illustrating a CNT (Conditionally Non-linear Transform) coding method.

The encoder may generate a reconstructed signal based on at least one of all of previously reconstructed signals and context signals (S510). In this case, the context signal may include at least one of a previously reconstructed signal, a previously reconstructed intra-coded signal, and another piece of information related to the decoding of a previously reconstructed portion or signal to be reconstructed, of a current frame. The reconstructed signal may be the sum of a prediction signal and a prediction error signal. Each of the prediction signal and the prediction error signal may be generated based on at least one of a previously reconstructed signal and a context signal.

The encoder may obtain an optimized transform coefficient that minimizes an optimization function (S520). In this case, the optimization function may include a distortion component, a rate component and a Lagrange multiplier λ. The distortion component may have a difference between the original video signal and a reconstructed signal, and the rate component may include a previously obtained transform coefficient. λ indicates a real number that maintains the balance of a distortion component and a rate component.

The obtained transform coefficient experiences quantization and entropy encoding and is then transmitted to the decoder (S530).

Meanwhile, the decoder receives the transmitted transform coefficient and obtains a prediction error vector through entropy decoding, dequantization and inverse transform processes. The prediction unit of the decoder generates a prediction signal using all of samples that have already been reconstructed and available, and may reconstruct a video signal based on the prediction signal and the reconstructed prediction error vector. In this case, the embodiments described in the encoder may be applied to the process of generating the prediction signal.

FIG. 6 is a flowchart illustrating a method for generating an optimized prediction signal based on a Conditionally Non-linear Transform (CNT) coding technique according to an embodiment of the present invention.

The present invention may generate a prediction signal using a previously reconstructed signal and a context signal (S610). For example, the previously reconstructed signal may represent a reconstructed signal defined in the above Equation 3. In addition, a non-linear prediction function may be applied to generate the prediction signal, and a different non-linear prediction function may be adaptively applied to each prediction signal.

The prediction signal may be added to a received prediction error signal e(i) (S620) to generate a reconstructed signal (S630). At this point, the step S620 may be performed by an adder (not shown).

The generated reconstructed signal may be stored for future reference (S640). The stored signal may be used to generate a next prediction signal.

As such, by removing restrictions on data which is available in a process of generating a prediction signal, that is, by generating a prediction signal using all previously reconstructed signals, it is possible to provide more enhanced compression efficiency.

FIG. 7 is a flowchart illustrating a method for determining CNT configuration information based on activity information according to an embodiment of the present invention.

The present invention provides a method for determining CNT configuration information using activity information.

In this case, the activity information represents information related to edge property of an image, and may include at least one of edge direction information or edge level information.

In addition, the edge direction information is information indicating a direction of edges in a block, and the edge level information is intensity information indicating how edges in a block are clear.

The CNT configuration information indicates configuration information necessary to perform CNT coding. For example, the CNT configuration information includes at least one of transmission unit information for transmitting a CNT flag, context model index information indicating a CABAC context model used in CNT flag coding, or a CNT prediction mode set indicating a CNT prediction mode. Meanwhile, in this specification, the CNT configuration information may be referred to as a CNT coding mode.

The present invention provides a method for configuring CNT setting information by inferring activity information of the current block based on activity information of a neighboring block.

The present invention provides a method for configuring Context-adaptive binary arithmetic coding (CABAC) context modeling of a CNT prediction mode, a CNT flag, and CNT additional information by analyzing activity information of an original image.

In this case, the CNT prediction mode indicates a mode for performing prediction based on a CNT coding technique, and, for example, the CNT prediction mode may be configured based on an intra prediction mode. As a specific example, in the case of a CNT directional mode, prediction may be performed in a corresponding direction using a previously decoded pixel.

The intra prediction mode may be defined as shown in Table 1, as below:

TABLE 1

| Intra prediction mode | Associated name |
|---|---|
| 0 | INTRA_PLANAR |
| 1 | INTRA_DC |
| 2 . . . 34 | (INTRA_ANGULAR2 . . . INTRA_ANGULAR34) |

For example, the CNT prediction mode may be defined as shown in Table 2, as below.

TABLE 2

| CNT prediction mode | Associated name |
|---|---|
| 0 | CNT_PLANAR |
| 1 | CNT_DC |
| 2 . . . 34 | CNT_ANGULAR2 . . . CNT_ANGULAR34 |

The above Table 2 is merely an example, and configuration of the CNT prediction mode may be determined based on activity information of an image. For example, in the case where frequency of activity information is high in a horizontal direction or in a vertical direction, the CNT prediction mode may be defined by the horizontal direction or the vertical direction.

In another example, the CNT prediction mode may be configured to have only some specific modes from among 35 modes. In yet another example, some of 35 prediction modes may be configured as CNT prediction modes, and other modes may be configured as the intra prediction modes shown in FIG. 1.

The present invention provides a method for transmitting CNT configuration information based on activity information.

The present invention provides a method for transmitting CNT configuration information through at least one level of a SPS and/or PPS, a picture, a CTU, a CU, a PU, or a block.

The present invention provides a method for transmitting an index indicating a configuration set that indicates a preset configuration set that configures CNT configuration information.

Referring to FIG. 7, at first, an encoder may obtain activity information (S710). In this case, the activity information may represent information related to edge property of an image, and may include at least one of edge direction information or edge level information.

The edge direction information may be defined as in Equation 5, and the edge level information may be defined as in Equation 6.

$$Dir_b = \begin{cases} 1, & \text{if } \left( \sum_{i=0}^{3} \sum_{j=0}^{3} H_{i,j} > 2 \times \sum_{i=0}^{3} \sum_{j=0}^{3} V_{i,j} \right) \\ 2, & \text{if } \left( \sum_{i=0}^{3} \sum_{j=0}^{3} V_{i,j} > 2 \times \sum_{i=0}^{3} \sum_{j=0}^{3} H_{i,j} \right) \\ 0, & \text{otherwise} \end{cases} \quad \text{[Equation 5]}$$

$$V_{i,j} = |\hat{I}_{i,j} \times 2 - \hat{I}_{i,j-1} - \hat{I}_{i,j+1}|,$$
$$H_{i,j} = |\hat{I}_{i,j} \times 2 - \hat{I}_{i-1,j} - \hat{I}_{i+1,j}|$$

$$Act_b = \sum_{i=0}^{3} \sum_{j=0}^{3} \left( \sum_{m=i-1}^{i+1} \sum_{n=j-1}^{j+1} (V_{m,n} + H_{m,n}) \right) \quad \text{[Equation 6]}$$

In this case, Vi,j denotes vertical edge distribution, Hi,j denotes horizontal edge distribution, and Ii,j denotes intensity. i,j denotes a position of a pixel in a block, and, in the case of a 4×4 block, i,j=0, 1, 2, 3.

In the above Equation 5, when the horizontal edge distribution Hi,j is high, the edge direction information Dirb may be 1; when the vertical edge distribution Vi,j is high, the edge direction information Dirb may be 2; and, in other cases, the edge direction information Dirb may be 0 which means there is no direction.

As such, according to 1D Laplacian value Dirb of a 4×4 block, the edge direction information Dirb may have three directions, and the edge direction information Dirb may have five edge level values according to the size of 2D Laplacian value Actb.

If there are many edges, an activity value increases due to drastic change in a pixel value. The CNT prediction coding performs prediction using an adjacent pixel value and thus is able to cope with drastic change in a pixel value due to an edge. Thus, it is possible to more efficiently construct CNT configuration information based on activity information.

In one embodiment, the activity information may be acquired using an original image or a reconstructed image. The original image is available only in the encoder, and the reconstructed image is available both in the encoder and the decoder.

However, in the case of obtaining activity information from the reconstructed image, the current block is not yet reconstructed so the activity information is not able to be known. In this case, the current block may be inferred from activity information of a block that temporally or spatially neighbors the current block. As methods of using activity information of the original image and the reconstructed image for CNT coding, the following embodiments are possible.

As one embodiment, in the case where activity information is obtained from an entire original image of a video signal, CNT configuration information may be applied to the entire original image.

In the case where activity information is obtained from an original image, the encoder may configure CNT configuration information from the activity information.

As one embodiment, in the case where frequency of activity information of an image is high in a horizontal direction or in a vertical direction, the CNT prediction mode may be defined by the horizontal direction or the vertical direction.

For example, the CNT prediction mode may be configured to have only some specific modes from among 35 modes. Alternatively, some of 35 prediction modes may be configured as CNT prediction modes, and other modes may be configured as intra prediction modes. Specifically, if frequency of activity information is high in the horizontal direction, a mode corresponding to the horizontal direction may be set as a CNT prediction mode, and other remaining modes may be set as an intra prediction mode. In doing so, a probability for a CNT prediction mode to be selected may be increased.

For example, in the case where small blocks having small edge levels are widely distributed in a picture, a CNT flag may be transmitted hierarchically.

In addition, in the case where blocks having great edge levels are generally distributed in a picture, a CNT flag may be transmitted to a lower level unit (e.g. PU).

In doing so, it is possible to prevent unnecessary transmission of a CNT flag.

In one embodiment, based on activity information (edge direction information and edge level information), CABAC context modeling of CNT configuration information may be applied differently. For example, when there are many blocks having small edge levels in a picture, an initial probability for a CNT flag to be 0 may be set to be high.

On the other hand, when there are many blocks having great edge levels in a picture, whether CNT is applied to the current blocks may be highly correlated to whether to CNT is applied to neighboring blocks, and thus, it may be configured to apply different context according to CNT flag values of the neighboring blocks.

In one embodiment, if a frequency of blocks having great edges in a picture is high, it is possible to reduce the number of bits for transmitting CNT prediction mode sets by reducing the number of CNT prediction modes.

If an edge level is great, a method (CNT coding technique) of predicting a pixel value from adjacent reconstructed pixels has a great gain, and thus, rather than subdividing directions by increasing the number of CNT prediction modes, reducing an amount of additional information to be transmitted by reducing the number of CNT prediction mode may be advantageous in coding efficiency.

The encoder may determine CNT configuration information based on activity information (S720). In this case, the CNT configuration information may represent configuration information necessary to perform CNT coding. For example, the CNT configuration information may include at least one of transmission unit information for transmitting a CNT flag, context model index information indicating a CABAC context model used in CNT flag coding, or a CNT prediction mode set indicating a CNT prediction mode.

In one embodiment, the CNT configuration setting information may be transmitted through at least one level of a SPS, a PPS, a picture, a CTU, a CU, a PU, or a block.

In another embodiment, the present invention may transmit an index indicating a preset configuration set that configures CNT configuration information. In this case, the configuration set may include at least one of the following: a CNT prediction mode, the number of CNT prediction modes, whether a hierarchical CNT flag is supported, information on a transmission unit for transmitting a CNT flag, context model index information indicating a CABAC context model used in CNT flag coding, or a CNT prediction mode set indicating a CNT prediction mode.

In yet another embodiment, a cycle of constructing the CNT configuration information may be determined in at least one level of a SPS, a PPS, a picture, a CTU, a CU, a PU, or a block.

In yet another embodiment, the configuration set may be transmitted all at once through a SPS, and only an index selecting one of the configuration set may be transmitted through a PPS.

The encoder may perform CNT coding based on the CNT configuration information (S730).

In this case, the CNT coding indicates performing coding using all previously decoded pixels, and may include CNT prediction coding.

FIG. 8 is a flowchart illustrating a method for performing CNT decoding based on a CNT flag according to an embodiment of the present invention.

Referring to FIG. 8, a decoder may parse CNT configuration information (S810) to construct CNT configuration information for an entire image.

The decoder may check or extract (or parse) a CNT flag (S820). The CNT flag may be acquired on the basis of a hierarchical level. In this case, the CNT configuration information may be applied on the basis of a corresponding level according to the CNT flag.

Then, the decoder may perform CNT decoding based on CNT configuration information of a corresponding level according to the CNT flag (S830).

FIG. 9 is a flowchart illustrating a method for determining CNT configuration information of the current block based on activity information of a neighboring block according to an embodiment of the present invention.

Referring to FIG. 9, a decoder may obtain activity information of a neighboring block (S910). As such, in the case where activity information is obtained from a reconstructed neighboring block of a video signal, CNT configuration information may be applied to the current block.

The decoder may derive CNT configuration information of the current block based on the activity information of the neighboring block (S920).

In one embodiment, edge direction information of the current block may be derived based on whether a left neighboring block and an upper neighboring block have the same prediction directional information.

In one embodiment, if the left neighboring block and the upper neighboring block have the same prediction directional information, the current block may have the same edge direction information. In addition, if the left neighboring block and the upper neighboring block have different prediction directional information, edge direction information of the current block may be set to be edge direction information of a neighboring block having great edge level information or may be set to be non-directional.

In one embodiment, edge level information of the current block may be derived from one of an average value, a minimum value, and a maximum value between an edge level value of the left neighboring block and an edge level value of the upper neighboring block.

In the case where whether CNT is applied to specific activity distribution is able to be known through statistical analysis of activity information, a CNT flag may not be transmitted.

In addition, by separately configuring a CABAC context model to be applied to CNT flag coding according to a range of an activity value, a corresponding context model may be designated from the derived activity value.

Meanwhile, the decoder may perform CNT decoding based on the CNT configuration information (S930).

FIG. 10 shows a syntax for transmitting CNT configuration information according to an embodiment of the present invention.

Referring to FIG. 10, the CNT configuration information includes at least one of transmission unit information for transmitting a CNT flag, context model index information indicating a CABAC context model used in CNT flag coding, or a CNT prediction mode set indicating a CNT prediction mode.

For example, the transmission unit information may be defined as CNT_flag_transfer_unit_size (1010), the context model index information may be defined as CNT_flag_context_model_idx (1020), and the CNT prediction mode set may be defined as CNT_directional_mode_cfg_idx (1030).

In addition, the CNT configuration information may be transmitted through at least one level of a SPS, a PPS, a picture, a CTU, a CU, a PU, or a block, and, for example, the example of FIG. 10 shows that the CNT configuration information is defined in a parameter set.

FIG. 11 is a flowchart illustrating a method for encoding an intra prediction mode according to an embodiment of the present invention.

Generally, when an image is partitioned into blocks, the current block to be coded and a neighboring block has similar image properties. In the case of an intra prediction mode, the current block and the neighboring block are highly likely to have an identical or similar intra prediction mode. Thus, an encoder may use a prediction mode of the neighboring block to encode a prediction mode of the current block.

FIG. 11 is described with reference to an intra prediction mode, but, when a CNT prediction mode defined in the present invention is used, the CNT prediction mode may be applied in a similarly way to perform encoding.

First, when a neighboring block is intra coded, an encoder may check or derive a prediction mode of the neighboring block (S1110).

For example, a prediction mode of the current block may be determined based on a prediction mode of a left neighboring block and a prediction mode of an upper neighboring block, and, in this case, a prediction mode of a corresponding neighboring block may be determined to be Most Probable Modes (MPM). The MPM may represent a mode that is used to prevent loss of redundant information and enhance coding efficiency in consideration of similarity between the current block and the neighboring block when performing intra prediction mode. Determination of the MPM may be represented as listing up MPM candidates (or an MPM list).

The encoder may check whether the prediction mode of the left neighboring block and the prediction mode of the upper neighboring block are the same (S1120).

If the prediction mode of the left neighboring block and the prediction mode of the upper neighboring block are not the same, a first MPM may be set to be a prediction mode of the left neighboring block, the second MPM may be set to be the prediction mode of the upper neighboring block, and the third MPM may be set to be any one of an intra planar mode, an intra DC mode, or an intra vertical mode (S1130).

Meanwhile, if the prediction mode of the left neighboring block and the prediction mode of the upper neighboring block are the same, the encoder may check whether the prediction mode of the left neighboring block is smaller than 2 (S1140).

If the prediction mode of the left neighboring block is smaller than 2, the first MPM may be set to be the intra planer mode, the second MPM may be set to be the intra DC mode, and the MPM may be set to be the intra vertical mode (S1150).

Meanwhile, if the prediction mode of the left neighboring block is not smaller than 2, the first MPM may be set to be the prediction mode of the left neighboring block, the second MPM may be set to be (the prediction mode of the left neighboring block −1), the third MPM may be set to be (the prediction mode of the left neighboring block +1) (S1660).

In addition, the encoder may determine whether an optimized prediction mode to be applied to the current block belongs to the previously configured MPM candidates.

If the intra prediction mode of the current block belongs to the MPM candidates, the encoder may encode an MPM flag and an MPM index. The MPM flag may indicate whether the intra prediction mode of the current block is able to be derived from a neighboring intra predicted block (that is, the prediction mode of the current block belongs to MPMs).

In addition, the MPM index may indicate which MPM candidate among the MPM candidates is applied as an intra prediction mode of the current block.

Meanwhile, in the case the intra prediction mode of the current block does not belong to the MPM candidates, the encoder may encode the intra prediction mode of the current block.

As described above, the encoder may use a prediction mode of a neighboring block to encode the prediction mode of the current block.

FIG. 12 is a flowchart illustrating a method for deciding an intra prediction mode according to an embodiment of the present invention.

FIG. 12 is described with reference to an intra prediction mode, but in the case where a CNT prediction mode defined in the present invention is used, the CNT prediction mode may be applied to perform decoding.

A decoder may obtain flag information indicating whether a prediction mode of the current block (or the current PU) is included in MPMs (S1210). For example, the flag information may be expressed as prev_intra_luma_pred_flag, and the decoder may check, based on the flag information, whether the prediction mode of the current block belongs to MPMs (S1220).

If the prediction mode of the current block is included in MPMs, the decoder may obtain an MPM index (S1230). For example, if prev_intra_luma_pred_flag=1, the decoder may obtain an MPM index.

In addition, the decoder may obtain a prediction value for the current block based on an intra prediction mode indicated by the MPM index, and reconstruct the current block using the prediction value.

On the other hand, if the prediction mode of the current block is not included in the MPMs, the decoder may obtain remaining prediction modes of the current block (S1240). The remaining prediction modes may indicate remaining prediction modes not included in the MPM, and may be expressed as rem_intra_luma_pred_mode. For example, the remaining prediction modes may indicate remaining prediction modes excluding an intra planer mode, an intra DC mode, and an intra vertical mode.

Similarly, the decoder may obtain a prediction value for the current block based on an intra prediction mode corresponding to the remaining prediction modes, and reconstruct the current block using the prediction value.

As such, in the case where MPMs are used, if the number of decoding mode is N, the minimum bit expressing this is Log 2(N), and, because the number of MPMs less than the number of intra modes is applied, a mode of the current block may be expressed with a far less number of bits.

For example, suppose that the number of intra prediction modes is 35 and the number of MPMs is 3, if the MPM modes are not used at all, 6 bit information needs to be transmitted to express 35 intra prediction modes. On the other hand, if three MPMs are used and a prediction mode of the current block is one of MPM candidates, information may be transmitted using only 2 bits: even if the prediction mode of the current block is not an MPM mode, one of 32 intra prediction modes, except three intra prediction modes able to be expressed by MPMs, may be selected, thereby reducing the number of bits.

FIG. 13 is a flowchart illustrating a method for determining an optimized prediction mode depending on whether CNT prediction coding is applied, according to an embodiment of the present invention.

The present invention provides an efficient additional information coding method for CNT coding. To reduce Rate-Distortion (RD) cost, reducing an amount of additional information may be advantageous more than enhancing prediction accuracy. Thus, if a method of reducing the number of selectable CNT prediction modes or applying CNT coding only to MPM candidates is used, it is possible to reduce an amount of additional information, thereby enhancing coding efficiency.

FIG. 13 shows a method for selecting an optimized prediction mode from a CNT prediction mode and/or an intra prediction mode to encode corresponding additional information.

First, the encoder may check whether to apply CNT prediction coding to an entire image or the current block (S1310).

If the CNT prediction is applied, the encoder may perform CNT prediction coding on the current block (S1320). On the contrary, if the CNT prediction coding is not applied, the encoder may perform intra prediction coding on the current block (S1330).

The encoder may determine an optimized prediction mode by comparing RD cost between the CNT prediction coding and the intra prediction coding (S1340).

The encoder may perform prediction according to the optimized prediction mode (S1350).

Meanwhile, the decoder may parse additional information from a bitstream. The additional information may include at least one of CNT configuration information or a CNT flag. When CNT coding is applied, the decoder may generate a CNT prediction mode candidate list. For example, when CNT coding is able to be applied only to MPM candidates, a CNT prediction mode candidate list may be composed of only the MPM candidates.

In addition, the decoder may determine a CNT prediction mode from the CNT prediction mode candidate list based on a CNT prediction mode set.

The decoder may perform CNT prediction coding based on the CNT prediction mode.

Meanwhile, when CNT coding is not applied, the decoder may generate a candidate list (e.g., an intra prediction mode candidate list) other than the CNT prediction mode. Hereinafter, a procedure similar to the above-described method may be performed.

FIG. 14 is a flowchart illustrating a method for performing CNT prediction coding based on an MPM index according to an embodiment of the present invention.

First, a decoder may obtain an MPM index from a bitsream (S1410). The MPM index may indicate which MPM mode from MPM candidates is applied as a prediction mode of the current block. For example, if the MPM index is 3, the MPM index may indicate a CNT prediction mode.

The decoder may determine whether CNT prediction coding is applied based on the MPM index (S1420).

If CNT prediction coding is applied based on the MPM index, the decoder may generate a CNT application candidate list (S1430).

The decoder may perform CNT prediction coding based on a CNT prediction mode (S1440). The CNT prediction mode may be selected from the CNT prediction mode candidate list based on the CNT prediction mode set.

On the contrary, if CNT prediction coding is not applied based on the MPM index, the decoder may generate a CNT non-application candidate list (e.g. an intra prediction mode candidate list) (S1450).

The decoder may perform intra prediction coding based on an intra prediction mode (S1460).

The current block may be reconstructed using a prediction value which is generated according to the CNT prediction coding or the intra prediction coding (S1470).

FIGS. 15 to 19 show syntaxes for efficiently transmitting CNT configuration information and/or CNT coding information according to an embodiment of the present invention.

FIG. 15 shows a method for transmitting a CNT flag.

Referring to FIG. 15, when CNT coding is able to be applied only to MPM candidates, a CNT prediction mode candidate list may be composed of only the MPM candidates.

In this case, it is possible to reduce a transmission amount of a CNT flag by moving a CNT flag 1510 to be next to prev_intra_luma_pred_flag.

In addition, it is possible to compose MPM candidates only for CNT according to a CNT flag value. That is, when a CAN flag is 0, the MPM candidates used in an intra prediction modes are used themselves, and, when a CNT flag is 1, CNT is applied and thus some suitable prediction modes may be selected as MPM candidates.

In a first example, the same candidates as in the aforementioned MPM candidate list for the Intra prediction mode may be used.

In a second example, the number of MPM candidates for CNT may be increased. For example, the number of CNT MPM candidates may be increased to 4 or more. Specifically, when a mod direction of a neighboring block is a horizontal direction, four or more horizontal CNT prediction modes may be selected and set as MPM candidates. In the case where the number of supportable CNT prediction modes is much more than the number of MPM candidates, if probable MPM candidates are selected, CNT may be applied only in an MPM mode so that restriction of selection occurring when CNT is applied may be overcome.

In a third example, in the case where there is a small number of supportable CNT prediction modes, all available CNT prediction modes may be set to be MPM candidates. For example, if the number of available CNT prediction modes is 8, the number of MPM candidates for the CNT prediction modes may be set to 8. In this case, an MPM index may be varied or signaled to a fixed length according to a probability distribution of the CNT predictions modes.

FIG. 16 shows a method of transmitting a CNT remaining mode flag.

Referring to FIG. 16, it is possible to define a CNT remaining mode flag for selecting CNT remaining modes other than MPM candidates so as to designate all available CNT prediction modes.

For example, a CNT flag may be extracted (1610), and, only when the CNT flag is 1 (1620), a CNT remaining mode flag may be extracted (1630).

In addition, when the CNT remaining mode flag is 1 (1640), a CNT remaining mode index indicating CNT remaining modes other than MPM candidates may be extracted subsequently (1650).

Meanwhile, when the CNT remaining mode flag is 0 (1660) while the CNT flag is 0 or 1, the MPM index may be extracted (1670). In other cases, a remaining intra prediction mode may be extracted (1680).

FIG. 17 shows a method for transmitting a CNT remaining mode without transmitting a CNT remaining mode flag.

When a CNT remaining mode flag is 0, an MPM index is transmitted to select one of MPM candidates. Thus, even a method for supporting a CNT remaining mode without transmitting a CNT remaining mode flag is also possible. For example, when an MPM index is 0 to 2, the MPM index may indicate existing MPM candidates, and, when an MPM index is 3, a CNT remaining mode index may be transmitted.

Referring to FIG. 17, a decoder may extract a CNT flag and an MPM index (1710, 1720).

Then, when the CNT flag is 1 and the MPM index is 3 (1730), a CNT remaining mode index may be extracted (1740).

In other cases, a remaining intra prediction mode may be extracted (1750).

FIG. 18 shows the case where whether to apply CNT is notified without transmitting a CNT flag in configuration where CNT is applied only to MPM candidates.

For example, it is possible to set an intra prediction mode to be applied when an MPM index is 0 to 2, and set a CNT prediction mode to be applied only when an MPM index is 3.

Referring to FIG. 18, a decoder may extract an MPM index, and, when the MPM index is 3 (1810), the decoder may extract a CNT prediction mode set CNT_mode_idx indicating a CNT prediction mode (1820).

In other cases, the decoder may extract a remaining intra prediction mode (1830).

FIG. 19 shows a method for applying CNT only when a mode is not an MPM candidate.

Referring to FIG. 19, a decoder may extract a flag prev_intra_luma_pred_flag indicating whether a prediction mode of the current block (or the current PU) is included in MPMs.

If the prediction mode of the current block is included in MPMs, the decoder may obtain an MPM index.

If not, the decoder may extract a CNT flag (1910).

If the CNT flag is 1 (1920), the decoder may extract a CNT prediction mode set (1930).

In other cases, the decoder may extract a remaining intra prediction mode (1940).

In another embodiment, a CNT flag may be transmitted only for a specific prediction mode. For example, if the $0^{th}$, $1^{st}$, $2^{nd}$, $10^{th}$, $18^{th}$, $26^{th}$, and $36^{th}$ modes are supported (with reference to an intra prediction mode) in CNT coding, a CNT flag is transmitted only when a corresponding mode is selected to indicate whether to apply CNT prediction coding. Regarding this, the following examples may be applied.

In a first example, a CNT flag may be transmitted for any mode in which CNT is able to be applied, regardless of use of MPM candidates.

In a second example, a CNT flag may be transmitted for modes in which CNT is able to be applied only when an MPM flag is 1 (use of MPM candidates).

In a third example, a CNT flag may be transmitted for modes in which CNT is able to be applied only when an MPM flag is 0 (non-use of MPM candidates).

In a fourth example, modes for additionally transmitting a CNT flag may be selected according to an intra directional mode of a neighboring block. For example, if a left neighboring block and an upper neighboring block are both encoded in a horizontal mode, a CNT flag may be transmitted only for modes corresponding to the horizontal direction. That is, when the current block is CNT coded, it is determined that the current block is highly likely to be encoded in the horizontal direction, and thus, CNT is applied only to modes corresponding to the horizontal direction.

In a fifth example, it is possible to change a CNT flag transmitting method of the current block depending on whether a neighboring block is CNT coded. For example, when a left neighboring block and an upper neighboring block are both CNT coded, it is determined that the current block is highly likely to be CNT coded, and thus, a CNT flag is transmitted for all prediction modes.

If there is no neighboring block which is CNT coded, a CNT flag may be transmitted only for MPM candidates or only for modes which are not the MPM candidates.

In a sixth example, the above-described five examples may be used in combination. For example, the fourth example and the fifth example may be applied only for modes which are not MPM candidates.

In yet another example, a CNT flag may be transmitted hierarchically. For example, a hierarchical CNT flag indicating whether a CNT coded block exists in a N×N or greater block may be transmitted.

Only when the hierarchical CNT flag is 1, each CNT flag may be transmitted for inner blocks that form a N×N block.

In a first example, even though a hierarchical CNT flag is configured to be transmitted to N×N block, if a block in size greater than N×N is not partitioned but coded as a single block, only one hierarchical CNT flag may be configured to be transmitted to this block.

In a second example, the minimum unit for transmission of a hierarchical CNT flag may be set a Coding Unit (CU), rather than a N×N block.

In a third example, a layer may be composed of two or more levels. The above example is an example in which a hierarchical CNT flag is transmitted only for a N×N or greater block: however, a CNT flag may be transmitted for a N'×N' block (N'>N) to check whether a CNT coded block exists inside, and, if the N×N block exists inside, a hierarchical CNT flag may be transmitted again.

Alternatively, a CNT flag may be transmitted first on the basis of an LCU, and, if a CU exists inside, a hierarchical CNT flag may be transmitted again. In addition, a CNT flag may be transmitted for each PU inside the CU to indicate whether CNT is applied.

As described above, the embodiments described in the present invention may be performed by implementing them on a processor, a microprocessor, a controller or a chip. For example, the functional units depicted in FIGS. 1, 2, 3 and 4 may be performed by implementing them on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for encoding a video signal, comprising:
obtaining activity information from the video signal, wherein the activity information represents information related to edge property of an image and includes at least one of edge direction information or edge level information;
determining Conditionally Non-linear Transform (CNT) configuration information based on the activity information; and
performing a CNT prediction coding based on the CNT configuration information,
wherein the CNT prediction coding includes performing a prediction using all previously decoded pixel values.

2. The method of claim 1, wherein, when the activity information is obtained from an entire original image of the video signal, the CNT configuration information is applied to the entire original image.

3. The method of claim 1, wherein, when the activity information is obtained from a reconstructed neighboring block of the video signal, the CNT configuration information is applied to a current block.

4. The method of claim 3, wherein edge direction information of the current block is derived based on whether a left neighboring block and an upper neighboring block have same prediction directional information.

5. The method of claim 4, wherein:
when the left neighboring block and the upper neighboring block have the same prediction directional information, the current block has the same edge direction information, and
when the left neighboring block and the upper neighboring block have different prediction directional information, the current block is set to have edge direction information of a neighboring block having greater edge level information.

6. The method of claim 1, wherein the CNT configuration information comprises at least one of transmission unit information for transmitting a CNT flag, context model index information indicating a Context-Adaptive Binary Arithmetic Coding (CABAC) context model used in CNT flag coding, or a CNT prediction mode set indicating a CNT prediction mode.

7. The method of claim 6, wherein a number of the CNT prediction modes is determined based on the edge direction information.

8. The method of claim 6, wherein the CNT configuration information is transmitted through at least one level of a sequence parameter set (SPS), a picture parameter set (PPS), a picture, a coding tree unit (CTU), a coding unit (CU), a prediction unit (PU), or a block.

9. A method for decoding a video signal, comprising:
obtaining activity information from a reconstructed neighboring block, wherein the activity information represents information related to edge property of an image and includes at least one of edge direction information or edge level information;
deriving Conditionally Non-linear Transform (CNT) configuration information for a current block based on the activity information; and
performing a CNT prediction coding on the current block based on the CNT configuration information,
wherein the CNT prediction coding comprises performing a prediction using all previously decoded pixel values according to a CNT prediction mode.

10. The method of claim 9, further comprising
extracting a CNT flag for the current block from the video signal,
wherein the CNT flag indicates whether CNT coding is applied to the current block, and
wherein, when CNT coding is applied to the current block according to the CNT flag, the CNT prediction coding is performed.

11. The method of claim 9, wherein the edge direction information for the current block is derived based on whether a left neighboring block and an upper neighboring block have same prediction directional information.

12. The method of claim 9, wherein a number of the CNT prediction mode is determined based on edge direction information for the current block.

13. An apparatus for encoding a video signal, comprising:
an edge detection unit configured to obtain activity information from the video signal; and
a prediction unit configured to determine Conditionally Non-linear Transform (CNT) configuration information based on the activity information, and perform CNT prediction coding based on the CNT configuration information,
wherein the activity information represents information related to edge property of an image and includes at least one of edge direction information or edge level information, and
wherein the CNT prediction coding performs a prediction using all previously decoded pixel values according to a CNT prediction mode.

14. An apparatus for decoding a video signal, comprising:
a prediction unit configured to obtain activity information from a reconstructed neighboring block, determine Conditionally Non-linear Transform (CNT) configuration information for a current block based on the activity information, and perform CNT prediction coding on the current block based on the CNT configuration information; and
a reconstruction unit configured to reconstruct the current block using a CNT prediction coding result value,
wherein the activity information represents information related to edge property of an image and includes at least one of edge direction information or edge level information, and
wherein the CNT prediction coding is performing prediction using all previously decoded pixel values according to CNT prediction modes.

* * * * *